(12) United States Patent
Rinklin

(10) Patent No.: US 8,591,086 B2
(45) Date of Patent: Nov. 26, 2013

(54) PASSENGER VEHICLE

(75) Inventor: Gerhard Rinklin, Tiefenbronn (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 530 days.

(21) Appl. No.: 12/885,595

(22) Filed: Sep. 20, 2010

(65) Prior Publication Data

US 2011/0069506 A1 Mar. 24, 2011

(30) Foreign Application Priority Data

Sep. 21, 2009 (DE) .......................... 10 2009 042 415

(51) Int. Cl.
*F21V 11/00* (2006.01)
(52) U.S. Cl.
USPC .......................................... 362/549; 362/507
(58) Field of Classification Search
USPC .................. 362/505, 506, 507, 549; 296/155, 296/193.09, 203.02
See application file for complete search history.

(56) References Cited

U.S. PATENT DOCUMENTS

| 6,523,886 B2 | 2/2003 | Hoffner et al. |
| 7,097,239 B2 | 8/2006 | Lazzeroni |
| 7,607,723 B2 * | 10/2009 | Bierjon et al. ........... 296/203.02 |
| 2009/0196065 A1 | 8/2009 | Joly-Pottuz et al. |

FOREIGN PATENT DOCUMENTS

| DE | 10013574 A1 | 1/2001 |
| DE | 602004000623 T2 | 5/2007 |
| DE | 102006058857 A1 | 6/2008 |

* cited by examiner

*Primary Examiner* — Y My Quach Lee
(74) *Attorney, Agent, or Firm* — Gerald E. Hespos; Michael J. Porco; Matthew T. Hespos

(57) ABSTRACT

A passenger vehicle has a front or rear bodyshell structure with a respective lamp receiving space for receiving a lamp on a left and right vehicle side. One holder per vehicle side is fit laterally from the outside onto the bodyshell structure in the region of the respective lamp receiving space. One holding strip per vehicle side is fit from the outside on the front or rear side onto the bodyshell structure in the region of the respective lamp receiving space. A front or rear side panel is fit from the outside onto the two holders and onto the two holding strips on each vehicle side.

14 Claims, 4 Drawing Sheets

PASSENGER VEHICLE

CROSS-REFERENCE TO RELATED APPLICATIONS

This application claims priority under 35 USC 119 to German Patent Application No. 10 2009 042 415.6 filed on Sep. 21, 2009, the entire disclosure of which is incorporated herein by reference.

BACKGROUND OF THE INVENTION

1. Field of the Invention

The invention relates to a passenger vehicle with front or rear bodyshell structures that have lamp receiving spaces for receiving lamps on left and right vehicle sides.

2. Description of the Related Art

A passenger vehicle is finished by fitting together a plurality of separately produced components or subassemblies and fitting these components adjacent to one another in the region of a lamp receiving space of the vehicle. The components or subassemblies form part of the externally visible outer skin of the vehicle body. For example, the bodyshell structure can form a vehicle outer skin region that upwardly adjoins the lamp receiving space. Furthermore, a panel may be fit onto the bodyshell structure and may form a vehicle outer skin section that downwardly adjoins the lamp receiving space. The lamp or the housing on the light emitting side of the lamp also forms a vehicle outer skin part in the lamp receiving space. The above-described components must be fit together very carefully to maintain predetermined relative positions so that a uniform overall impression of high value, quality and aesthetics is assured. In particular, a predefined joint appearance must be kept as exact as possible, since even small deviations in this regard are readily visible to the observer.

An object of the invention is to provide a vehicle that can assure a high quality appearance in the area of the lamp receiving spaces while providing a simple installation.

SUMMARY OF THE INVENTION

The invention relates to fastening a front or rear panel to front or rear bodyshell structure of a vehicle indirectly via a holder and a holding strip. The holder can be fit laterally from the outside onto the bodyshell structure in the region of the respective lamp receiving space. The holding strip also can be fit from the outside on the front or rear side onto the bodyshell structure in the region of the respective lamp receiving space. The holder and holding strip of this type can be produced with comparatively exact tolerances, for example, as an injected molded plastic part. The holder and holding strip can be positioned and fixed comparatively simply on the bodyshell structure in a relative position predetermined for this purpose. As a result, the subsequent installation of the panel is simplified considerably because the panel can be positioned and fixed on the holders and holding strips comparatively simply and with great accuracy. Thus, the holders and the holding strips provide a simple universal receiving and fixing concept. Furthermore, the holders and the holding strips can be preassembled with positional accuracy relative to the appropriate lamp receiving space of the bodyshell. Consequently, the panel does not require a complicated alignment or adjustment with respect to the bodyshell structure. The desired positioning emerges automatically and virtually by itself when fitting the panel to the holders and the holding strips. A high value, high quality joint appearance is achieved and therefore a visually attractive outer skin is realized in the region of the vehicle near the lamp receiving spaces without a substantial increase in the outlay on installation.

A lamp can be inserted into the respective lamp receiving space on each vehicle side and a lamp housing of the respective lamp can be held on the respective holding strip at an end proximal to the panel. The holding and positioning of the respective lamp on the respective holding strip leads automatically to the desired optimum positioning of the lamp and the lamp housing relative to the panel and relative to the bodyshell structure. To this extent, when installed, the lamp adds to the high-value appearance of the vehicle outer skin in the region of the respective lamp receiving space.

The respective holding strip can be coupled to the respective holder via a positioning coupling. The positioning coupling is configured to define a predetermined reference point for positioning the holding strip relative to the holder. The establishment of the predetermined relative position between the holding strip and holder is simplified considerably by the stipulation of the reference point, since at least one degree of freedom of movement is taken away from the entire system.

Further important features and advantages of the invention emerge from the drawings and from the associated description of the figures with reference to the drawings.

The features mentioned above and those which have yet to be explained below can be used in the stated combination and also in different combinations or on their own without departing from the scope of the invention.

Preferred embodiments of the invention are illustrated in the drawings and are explained in more detail in the description below, in which the same reference numbers refer to identical, similar or functionally identical components.

DETAILED DESCRIPTION OF THE PREFERRED EMBODIMENTS

Figure 1:
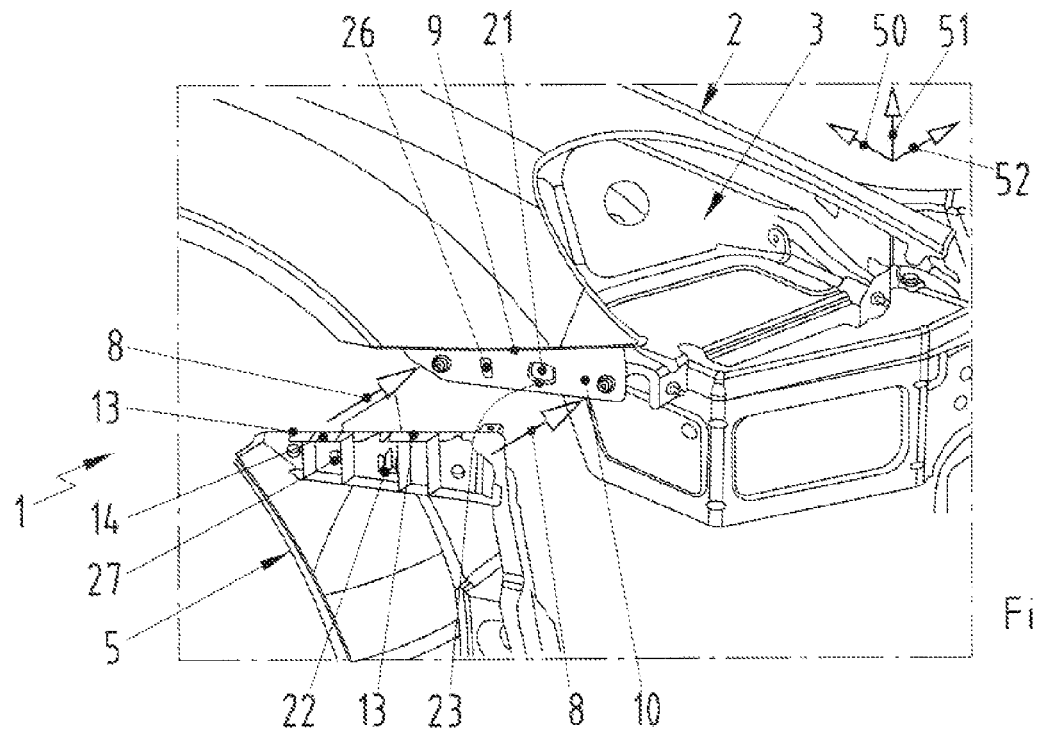
FIG. 1 is a perspective view of a region of a bodyshell structure during the installation of a lateral holder.

According to FIGS. 1 to 13, a passenger vehicle 1, only part of which is illustrated, comprises front and rear bodyshell structures. The embodiment described below involves a rear bodyshell structure 2. It is clear that another embodiment may also involve a front bodyshell structure.

The bodyshell structure 2 has lamp receiving spaces 3 on left and right vehicle sides. Only the left lamp receiving space 3 can be seen in the figures. The bodyshell structure 2 is constructed mirror-symmetrically with respect to a vertical longitudinal center plane of the vehicle 1. The lamp receiving space 3 can receive a lamp 4, as shown in FIGS. 10 to 13.

Figure 2:
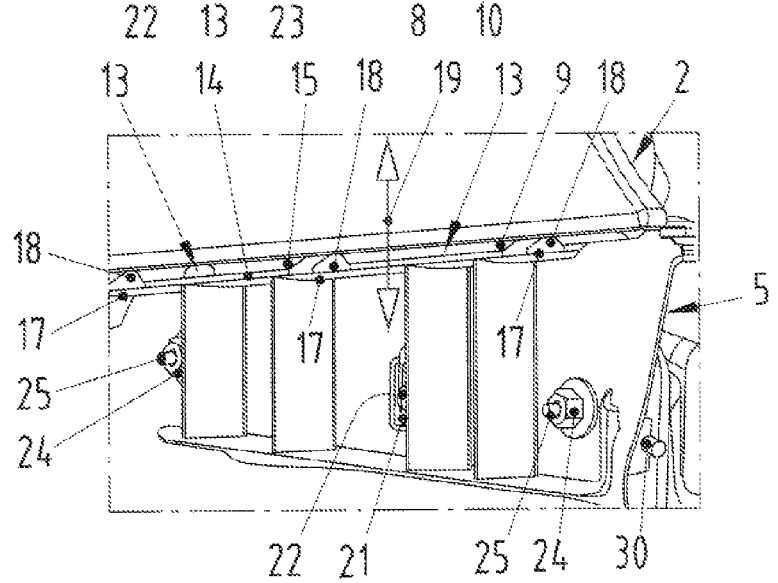
FIG. 2 is an enlarged perspective view of the bodyshell structure in the region of the fitted holder.
Figure 3:
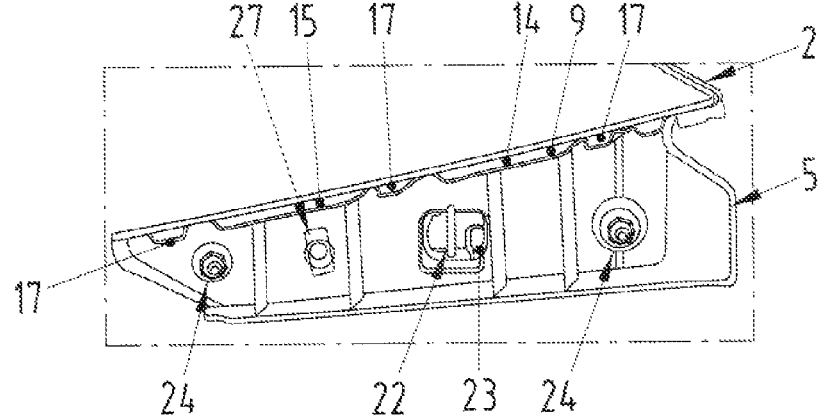
FIG. 3 is a perspective side view of the bodyshell structure in the region of the holder.
Figure 4:
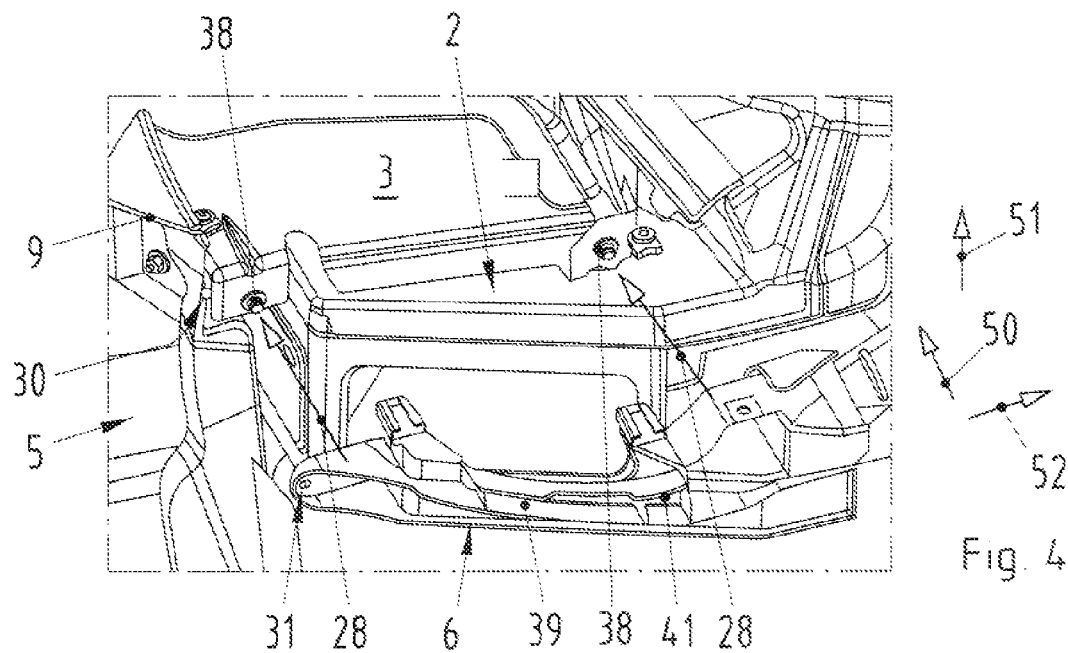
FIG. 4 is a perspective view of the bodyshell structure during the installation of a holding strip.
Figure 5:
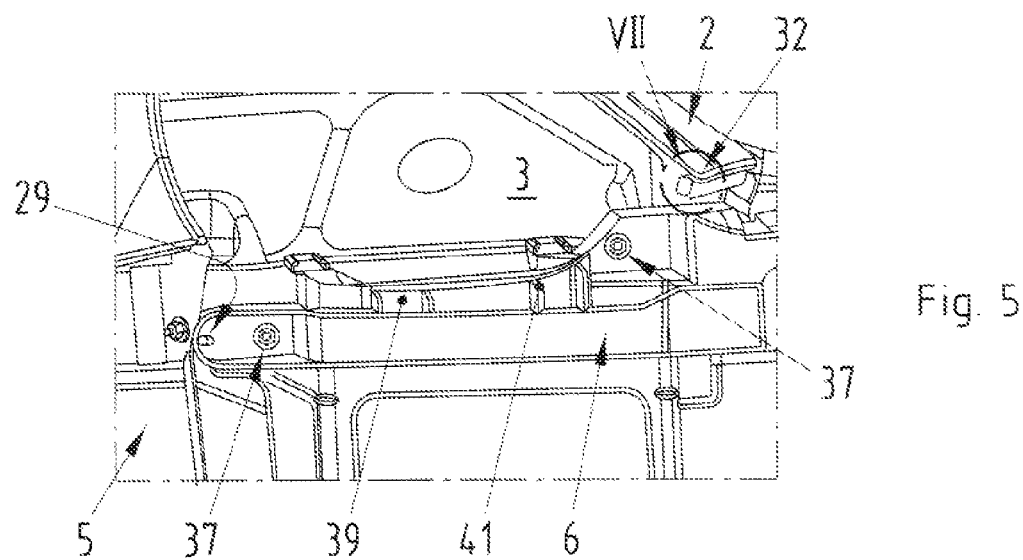
FIG. 5 is a perspective view of the bodyshell structure in the vehicle longitudinal axis in the region of the fitted holding strip.

One holder 5 is provided at each vehicle side, according to FIGS. 1 to 3, at the front and/or at the rear of the vehicle. Thus, a total of four holders 5 can be provided, namely, at the front left, the front right, the rear left and the rear right. The provision of front holders 5 does not necessarily require rear holders 5 to be provided. Similarly, the provision of rear holders 5 does not necessarily require front holders to be provided. In the example, again only the left holder 5 can be seen. Each holder 5 is fit laterally from the outside onto the bodyshell structure 2 in the region of the adjacent lamp receiving space 3. Therefore, in the example shown here, the left holder 5 is fit onto the bodyshell structure 2 from the left vehicle side.

One holding strip 6 is provided for each holder 5 and hence for each vehicle side, as shown in FIGS. 4 to 7. In the example, only the left holding strip 6 is illustrated. Each holding strip 6 is fit from the outside onto the bodyshell structure 2 in the region of the respective lamp receiving space 3 and along the vehicle longitudinal axis, which is represented by an arrow 50. In other words, the respective holding strip 6 is fit on the front side or rear side onto the bodyshell structure 2. In the case of the rear bodyshell structure 2 shown here, the respective holding strip 6 is fit on the rear from the outside or from the rear onto the bodyshell structure 2.

Figure 8:
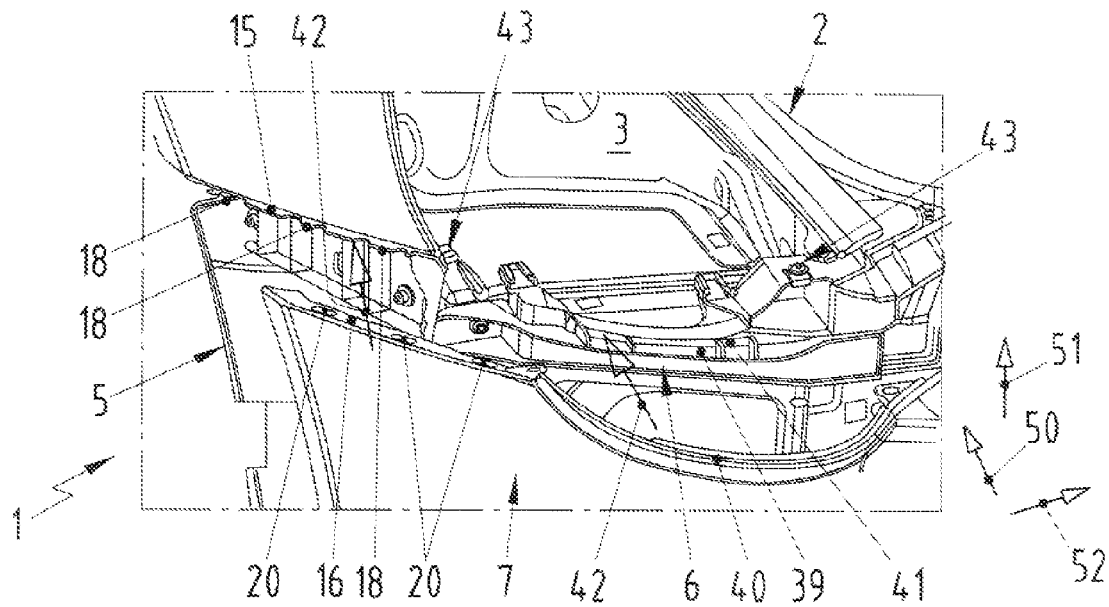
FIG. 8 is a perspective view of the bodyshell structure with preassembled holder and preassembled holding strip during the installation of a panel.
Figure 9:
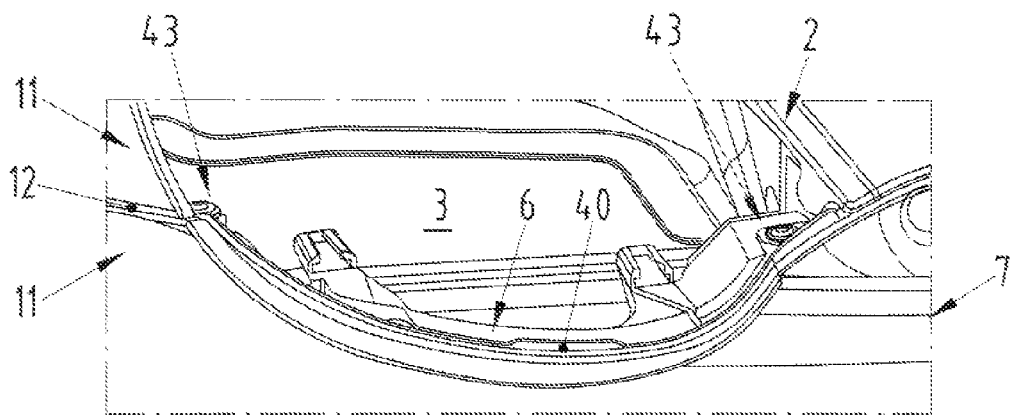
FIG. 9 is an enlarged detailed view in the region of the fitted panel.

A panel 7 also is provided, as shown in FIGS. 8 and 9. In the example, only a left section of the panel 7 can be seen. However, in the fitted state, the panel 7 extends from the holder 5 on one vehicle side to the holder 5 on the other vehicle side. Accordingly, a front or rear panel 7 is associated with each holder 5. In the illustrated rear bodyshell structure 2, the rear-side panel 7 is fit from the outside onto the two holders 5 and onto the two holding strips 6 on each vehicle side.

As shown in FIGS. 10 to 13, one lamp 4 is provided per vehicle side. The lamp 4 has a lamp housing 45 that is inserted into the respective lamp receptacle 3. For this purpose, the lamp housing 45 is fit onto the respective holding strip 6 and onto the bodyshell structure 2.

A method for producing the vehicle 1 in the region of the bodyshell structure 2 is explained in more detail below. At the same time, special embodiments that can be realized cumulatively or alternatively and in any combination also are explained in more detail.

The respective holder 5 is fit laterally on the bodyshell structure 2 on each vehicle side, as shown in FIG. 1. Arrows 8 in FIG. 1 illustrate the lateral guiding of the respective holder 5 onto the bodyshell structure 2. The bodyshell structure 2 has an edge region 9 for installing the holder 5 and a side tab 10 is angled away from the edge region 9. The side tab 10 also is referred to below as a bent-out vertical portion 10. In the fit state shown in FIGS. 9 and 10, the edge region 9 defines one side of a joint 12 in an outer skin 11 of the vehicle 1. The holder 5 is fit onto the bent-out vertical portion 10 so that at least one positioning stop 13 comes to bear against the edge region 9. Thus, a relative position between the holder 5 and bodyshell structure 2 is defined in a vertical axis of the vehicle. In the example, two positioning stops 13 are spaced apart from each other. The positioning stops 13 are formed on a clamping strip 14 on the respective holder 5 and ensure that the clamping strip 14 is positioned relative to the edge region 9 at a predetermined distance. In addition, the clamping strip 14 positioned in this manner forms a lateral slide-in slot 15 in the fit state of the holder 5. A lateral tab or bent-out flange 16 is formed on the panel 7 and can be slid into the lateral slide-in slot 15. In addition, latching fingers 17 are formed on the clamping strip 14 of the holder 5 at spaced apart positions.

Each latching finger 17 has a latching lug 18 and is spring-elastically flexible in a spacing direction 19 indicated by a double arrow in FIG. 2. In this case, the spacing direction 19 is oriented in the direction of the spacing between the clamping strip 14 and edge region 9. The latching lugs 18 each engage respectively in latching openings 20 formed on the lateral bent-out flange 16 of the panel 7 when the lateral bent-out flange 16 is slid sufficiently into the lateral slide-in slot 15 while fitting the panel 7.

The bent-out vertical portion 10 is formed on the bodyshell structure 2 for installing the holder 5 and has a positioning opening 21, as shown in FIG. 1. A spring element 22 is formed on the respective holder 5 and engages in the positioning opening 21 during the fitting of the holder 5. The spring element 22 is tensioned and produces a spring force that presses the holder 5 by means of the positioning stops 13 thereof in the vertical direction against the edge region 9. Thus, the spring element 22 together with the positioning opening 21 automatically and correctly positions the holder 5 relative to the body structure 2 during the fitting of the holder 5. In the preferred example, the spring element 22 is a clip. During the fitting of the holder 5, the respective clip 22 engages behind an opening edge 23 of the bent-out vertical portion 10 that surrounds the positioning opening 21. This further simplifies the installation considerably, since the holder 5 virtually merely has to be plugged onto the bodyshell structure 2. The clip 22 secures the holder 5 on the bent-out vertical portion 10 of the bodyshell structure 2 so that the fitter can let go of the holder 5, for example, to grasp nuts 24. The nuts 24 enable the holder 5 to be screwed to the bodyshell structure 2. Threaded bolts 25 can already be fixed on the bodyshell structure 2. It also is possible to plug in the threaded bolts 25 in the form of screws. The clip 22 ensures that the holder 5 bears with the positioning stops 13 against the edge region 9 in a prestressed manner, which is advantageous for precise positioning.

The respective bent-out vertical portion 10 also is provided with an adjusting opening 26 arranged at a distance from the positioning opening 21. The adjusting opening 26 is an elongated hole oriented perpendicular to the joint 12. A guide pin 27 formed on the holder 5 can engage in the adjusting opening 26 during the fitting operation. For this purpose, the guide pin 27 protrudes from the holder 5 on the side facing the bodyshell structure 2. The adjusting opening 26 in conjunction with the guide pin 27 automatically orients the holder 5 along the vehicle longitudinal axis 50 relative to the bodyshell structure 2 and therefore likewise relatively exactly with respect to the lamp receiving space 3. As an alternative, it also is possible to combine the functionalities of the clip 22 and of the guide pin 27 in a single element.

The two holding strips 6 are installed, in accordance with FIGS. 4 to 7, after the holders 5 have been fixed to the bodyshell structure 2. For this purpose, the respective holding strip 6 is fit to the bodyshell structure 2 parallel to the vehicle longitudinal axis 50 corresponding to arrows 28. In the example, the respective holding strip 6 is fit from the rear onto the bodyshell structure 2. As can be gathered from the detailed view of FIG. 6, a positioning coupling 29 can be provided between the holding strip 6 and the holder 5 to couple the holding strip 6 to the holder 5 on the respective vehicle side. The positioning coupling 29 removes a degree of freedom of movement from the system and hence simplifies the installation and orientation of the holding strip 6 in relation to the bodyshell structure 2. The positioning coupling 29 defines a reference point for the positioning of the holding strip 6 relative to the holder 5. The holder 5 already is positioned correctly with respect to the bodyshell structure 2 and thus positions the holding strip 6 properly relative to the body structure 2. In the example, the positioning coupling 29 has a positioning pin 30 and a positioning opening 31 that receives the positioning pin 30. The positioning pin 30 is formed on the holder 5 in the example, while the positioning opening 31 is formed on the holding strip 6. A reverse construction also is conceivable, with a positioning pin 30 formed on the holding strip 6 and a positioning opening 31 on the holder 5.

The positioning opening 31 is an elongated hole that is oriented along the vehicle transverse axis. Thus, the relative position between the holder 5 and holding strip 6 is predetermined in each case with respect to the vertical axis of the vehicle 1. This is of particular importance for the subsequent installation of the panel 7.

Figures 6, 7:
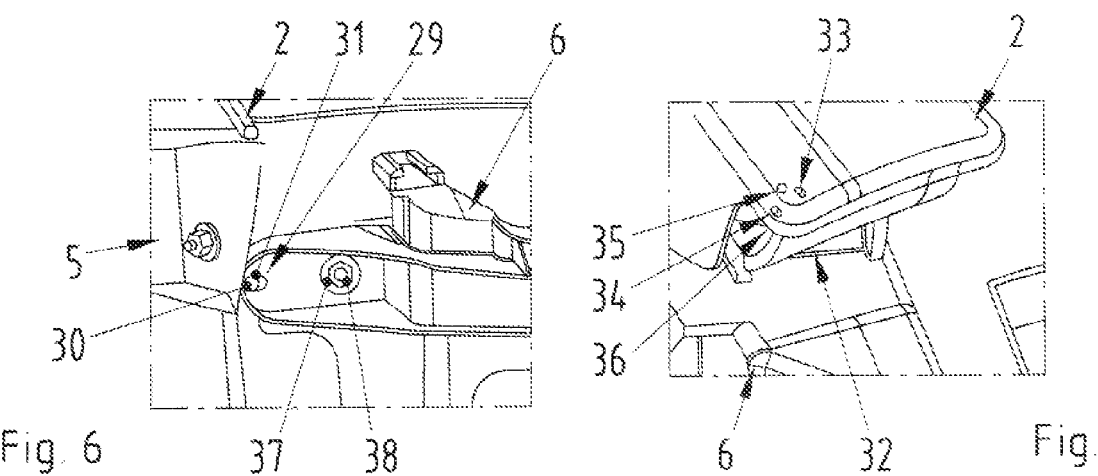
FIG. 6 is an enlarged perspective detailed view in the region of the fitted holding strip.
FIG. 7 is another enlarged perspective detailed view of the fitted holding strip.

According to FIG. 7, a second positioning coupling 32 is spaced from the above-described first positioning coupling 29. The second positioning coupling 32 couples the respective holding strip 6 to the bodyshell structure 2 to define a reference point for positioning the holding strip 6 relative to the bodyshell structure 2 during the fitting of the holding strip 6. The second positioning coupling 32 removes at least one further degree of freedom from the system, which simplifies the correct positioning of the holding strip 6 relative to the bodyshell structure 2.

Each second positioning coupling 32 is functionally similar to the first positioning coupling 29. In particular, each second positioning coupling 32 can comprise at least one positioning pin or positioning web and at least one positioning opening or at least one positioning stop, which interact with one another. In the example in FIG. 7, first and second positioning pins 33 and 34 are oriented perpendicularly to each other, i.e. at right angles to the positioning direction. The first positioning pin 33 is oriented along the vehicle vertical axis, as indicated by an arrow 51, and therefore defines the relative position between the holding strip 6 and bodyshell structure 2 along the vehicle vertical axis 51. The second positioning pin 34 is oriented along the vehicle transverse axis as indicated by an arrow 52, and thereby defines the position of the holding strip 6 relative to the bodyshell structure 2 along the vehicle transverse axis 52. The two positioning pins 33, 34 interact with two corresponding positioning openings 35 and 36, respectively, which define positioning stops. The positioning openings 35 and 36 are elongated holes oriented to provide the positioning pin 33, 34 engaging therein with a degree of freedom of movement running parallel to the orientation of the other positioning pin 33, 34 in each case. In the example, the two positioning pins 33, 34 are formed on the holding strip 6 while the two positioning openings 35, 36 are formed as stops on the bodyshell structure 2 using the part geometry of the bodyshell. Similarly, in another embodiment, the positioning pins 33, 34 can be formed on the bodyshell structure 2 using the part geometry of the bodyshell, while the two positioning openings 35, 36 then are formed as stops on the holding strip 6. A reference point on the bodyshell side is used since the adjustment of the relative position, i.e. the picking-up of the position of the respective add-on part, here the holding strip 6, takes place directly at the bodyshell structure 2 so that minimum losses due to tolerances occur. This has a particularly positive effect with regard to the appearance, quality of the joints and high value of the outer contour or outer skin 11 for the vehicle 1. As an alternative, a pin and hole positioning may also be provided.

The holding strip 6 is screwed to the bodyshell structure 2. More particularly, nuts 37 interact with threaded bolts 38 formed fixedly on the bodyshell structure 2 or are inserted through corresponding openings in the bodyshell structure 2.

The position of the holding strip 6 can be the basis for further connecting parts to be positioned on the bodywork, such as, for example, a spoiler module.

The respective holding strip 6 has a slot-shaped front or rear slide-in unit 39 for slidably receiving a front or rear bent-out flange 40 of the panel 7. The example involves a rear-side bodyshell structure 2 and accordingly a rear slide-in unit 39 is illustrated. In a manner complementary with respect thereto, the tab 40 formed on the panel 7 is a front tab 40. The rear slide-in unit 39 can form a clamping gap 41. The front tab 40 of the panel 7 is slid into the slide-in unit 39 sufficiently to engage in the clamping gap 41 and is held therein by means of gap clamping. Thus, the panel 7 is fixed frictionally on the respective holding strip 6. The panel 7 is therefore unambiguously positioned in the vertical direction.

The panel 7 is placed and fit from the outside onto the two holders 5 and onto the two holding strips 6, as shown in FIGS. 8 and 9. The panel 7 therefore is moved in accordance with the arrows 42. During the installation, the lateral bent-out flanges 16 engage in the lateral slide-in units 15 until the latching lugs 18 latch to the latching openings 20. In addition, the front tabs 40 of the panel 7 engage in the rear slide-in units 39 of the holding strips 6 until the front tabs 40 clamp in the clamping gaps 41. The fitter can subsequently let go of the panel 7, for example to grasp screws for a screw connection of the panel 7 to the two holders 5 and to the two holding strips 6. Screwing points are denoted by 43 in FIGS. 8 and 9. Alternatively a stop on the panel 7 can position the panel 7 along the vehicle longitudinal axis 50 with respect to the bodyshell structure 2 via the holding strip 6.

The panel 7 can be fixed to the bodyshell structure 2 without direct fastening so that the panel is fastened indirectly to the bodyshell structure 2 exclusively via the two holders 5 and the two holding strips 6.

By installing the panel 7 on the holders 5 and on the holding strips 6, a desired and positionally precise relative position of the panel 7 with respect to the bodyshell structure 2 is produced automatically.

The lamp 4 is installed as shown in FIGS. 10 to 13 after the panel 7 has been installed. For this purpose, the lamp 4 is inserted into the respective lamp receiving space 3 in accordance with arrows 44. In this case, the slide-in direction 44 is substantially parallel to the vehicle longitudinal axis 50. The lamp housing 45 of the lamp 4 is held on the respective holding strip 6 at a region facing the panel 7. For this purpose, the respective holding strip 6 has two fastening regions 46 that interact with corresponding fastening elements 47 of the lamp 4. The fastening regions 46 and the fastening elements 47 are designed so that the two fastening regions 46 position the lamp 4 along the vehicle vertical axis 51 while one of the two fastening regions 46 also positions along the vehicle transverse axis 51.

Figure 10:
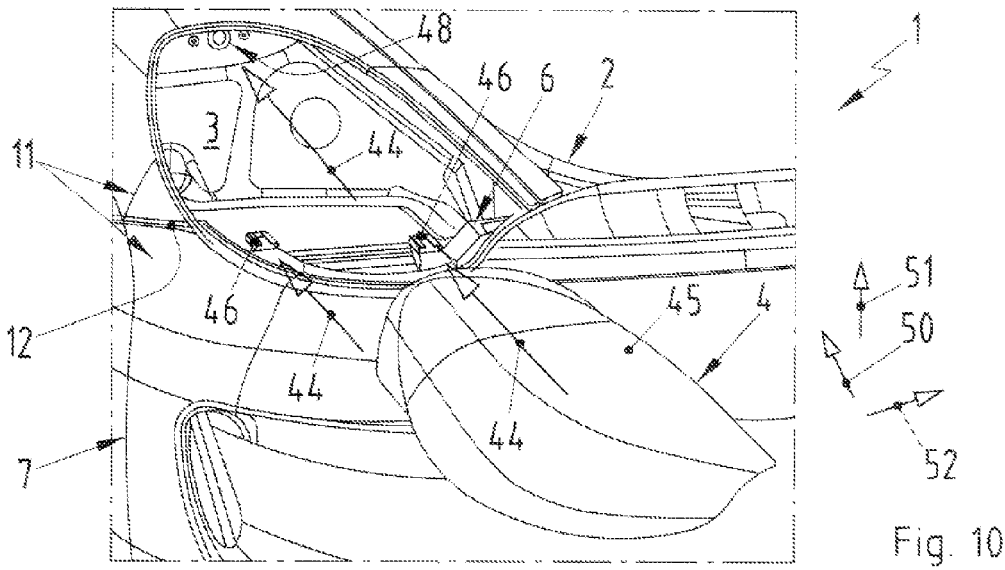
FIG. 10 is a perspective view of the bodyshell structure with preassembled holder and preassembled panel during the installation of a lamp.
Figures 11, 12:
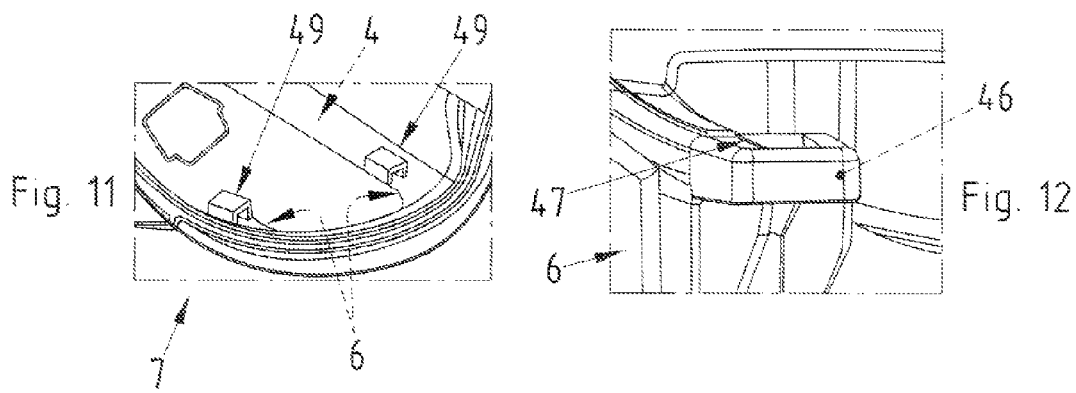
FIG. 11 is a perspective view from above in the region of a lamp receptacle with a lamp illustrated transparently.
FIG. 12 is an enlarged perspective detailed view from the inside in the region of a coupling between the lamp and holding strip and with the lamp illustrated transparently.
Figure 13:
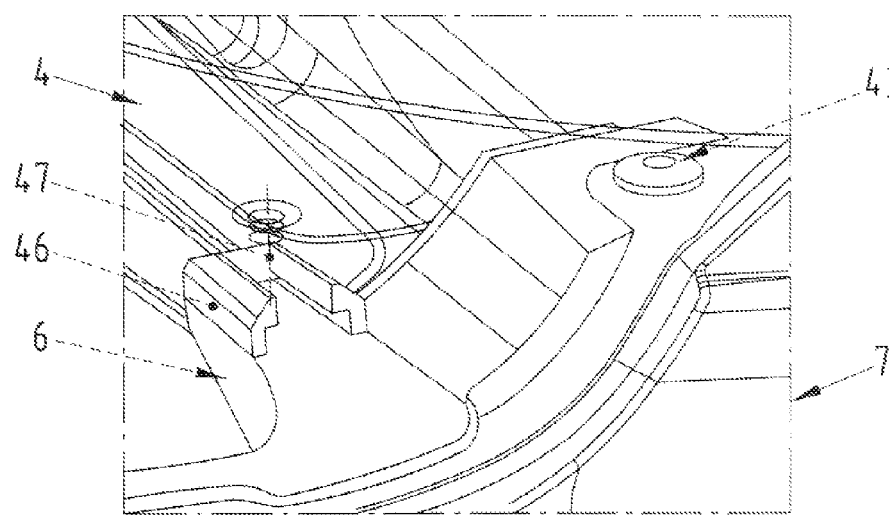
FIG. 13 is an enlarged perspective detailed view from the front of the region of the coupling between the lamp and holding strip with the lamp illustrated transparently.

In the embodiment shown here the fastening regions 46 are configured as plug-in shoes. The fastening elements 47 correspond to the fastening regions 46 and are pins oriented transverse to the plug-in direction. Each pin 47 has a radially protruding head at their free end, and hence is referred to as a "T pin". The respective lamp housing 45 is held on the bodyshell structure 2 on a side facing away from the panel 7. For this purpose, a holder (not shown) can be fit in a holding region 48 in the lamp receiving space 3 of the bodyshell structure 2, as shown in FIG. 10. The holder then interacts with a corresponding, complementary fastening element (not shown) of the lamp 4. The coupling in the holding region 48 between the bodyshell structure 2 and lamp housing 45 can be configured to be cardanic, for example in the manner of a ball headed joint to enable the lamp 4 to be oriented relative to the holding strip 6.

The lower side of the lamp housing 45 can have guide grooves 49 that interact with the fastening regions 46 of the holding strip 6 when the lamp housing 45 is pushed to permit guided sliding of the lamp 4 into the lamp receiving space 3. In addition, the guided sliding of the lamp 4 into the lamp receiving space 3 simplifies the engagement of the fastening element (not shown) of the lamp housing 45 into the holder of the bodyshell structure 2 (not shown). The fastening element is arranged distally with respect to the panel 7 and the holder is provided in the region 48.

The construction proposed here results in an appearance that is of high value in terms of quality for the outer skin 11 of the vehicle 1 in the region of the respective lamp 4 and is distinguished by standard or uniform joints. In this case, the outer skin 11 is formed at the top adjacent to the lamp 4 by the bodyshell structure 2 and at the bottom adjacent to the lamp 4 by the panel 7 and by the lamp housing 45. This aim is achieved in that the holding strip 6 is positioned to a greater or lesser extent on the direct reference surfaces of the reference part of the bodyshell structure 2 via the positioning pins 30, 33, 34 and via the positioning openings 31, 35, 36 that act as stops.

What is claimed is:

1. A passenger vehicle, comprising:
   a front or rear bodyshell structure that has left and right lamp receiving spaces for receiving lamps;
   holders fit laterally from an outer side onto the bodyshell structure in regions of the respective lamp receiving space, the holders having at least one positioning stop that bears against an edge region of the bodyshell structure, the edge region defining one side of a joint in an outer skin of the passenger vehicle;
   holding strips fit from the outer side onto the bodyshell structure in proximity to the respective lamp receiving spaces; and
   a panel fit from the outside onto the respective holder and the respective holding strips.

2. The passenger vehicle of claim 1, further comprising lamps inserted into the respective lamp receiving spaces, each lamp having a lamp housing held on the respective holding strip on a side proximal to the panel.

3. The passenger vehicle of claim 2, wherein the lamp housing of the respective lamp is held on the bodyshell structure on a side distal to the panel.

4. The passenger vehicle of claim 1, wherein the respective holder has at least two of the positioning stops on a clamping strip, said positioning stops positioning the clamping strip at a distance from an edge region and forming a lateral slide-in unit slidably receiving a lateral bent-out flange of the panel.

5. The passenger vehicle of claim 4, wherein at least one latching finger is arranged on the respective clamping strip, the latching finger being spring-elastic in a spacing direction between the clamping strip and an edge region and has a latching lug engaging in a latching opening formed on the lateral bent-out flange of the panel.

6. The passenger vehicle of claim 1, wherein the bodyshell structure has bent-out vertical portions aligned away from the respective edge regions, the holders being fit respectively on the bent-out vertical portions of the bodyshell structure, positioning openings being formed in the respective bent-out vertical portions, spring elements being formed on the respective holders and engaging in the respective positioning openings, the spring elements pressing the respective holders against the edge regions.

7. The passenger vehicle of claim 6, wherein the respective spring element is a clip that engages behind and locks to an opening edge of the bent-out vertical portion that bounds the respective positioning opening.

8. The passenger vehicle of claim 7, further comprising adjusting openings formed in the bent-out vertical portions and oriented at right angles to the joint, guide pins protruding from the holders and being received in the adjusting openings, positioning openings formed in the holding strips and positioning pins formed on the holders and being received in the respective positioning opening.

9. The passenger vehicle of claim 1, wherein a front or rear slide-in unit is formed on the respective holding strip for receiving a front or rear tab of the panel.

10. A passenger vehicle, comprising:
    a front or rear bodyshell structure that has left and right lamp receiving spaces for receiving lamps;
    holders fit laterally from an outer side onto the bodyshell structure in regions of the respective lamp receiving space;
    holding strips fit from the outer side onto the bodyshell structure in proximity to the respective lamp receiving spaces; and
    a panel fit from the outside onto the respective holder and the respective holding strips;
    a front or rear slide-in unit is formed on the respective holding strip for receiving a front or rear tab of the panel, wherein a clamping gap is formed in the front or rear slide-in unit, the front or rear tab being slid in and held by the clamping gap.

11. The passenger vehicle of claim 10, wherein the respective holding strip is coupled to the respective holder via a first positioning coupling, the first positioning coupling defining a first reference point for positioning the holding strip relative to the holder during fitting of the holding strip.

12. The passenger vehicle of claim 10, wherein the respective holding strip further is coupled to the bodyshell structure via a second positioning coupling, the second positioning coupling defining a second reference point for positioning the holding strip relative to the bodyshell structure during fitting of the holding strip.

13. The passenger vehicle of claim 12, wherein each positioning coupling has at least one positioning pin and at least one positioning opening in which the associated positioning pin engages.

14. The passenger vehicle of claim 10, wherein the holding strip has two holding regions for holding the lamp housing, the holding regions interacting with corresponding fastening elements of the lamp housing so that one of the holding regions positions the lamp housing along a vehicle transverse axis running transversely with respect to the vehicle longitudinal axis, and wherein both holding regions position the lamp housing along a vehicle vertical axis running transversely with respect to the vehicle longitudinal axis and transversely with respect to the vehicle transverse axis.

* * * * *